Aug. 21, 1956
F. W. KRIESEL
2,759,742
REACH AND AXLE STRUCTURE
Filed Nov. 9, 1953
2 Sheets-Sheet 2
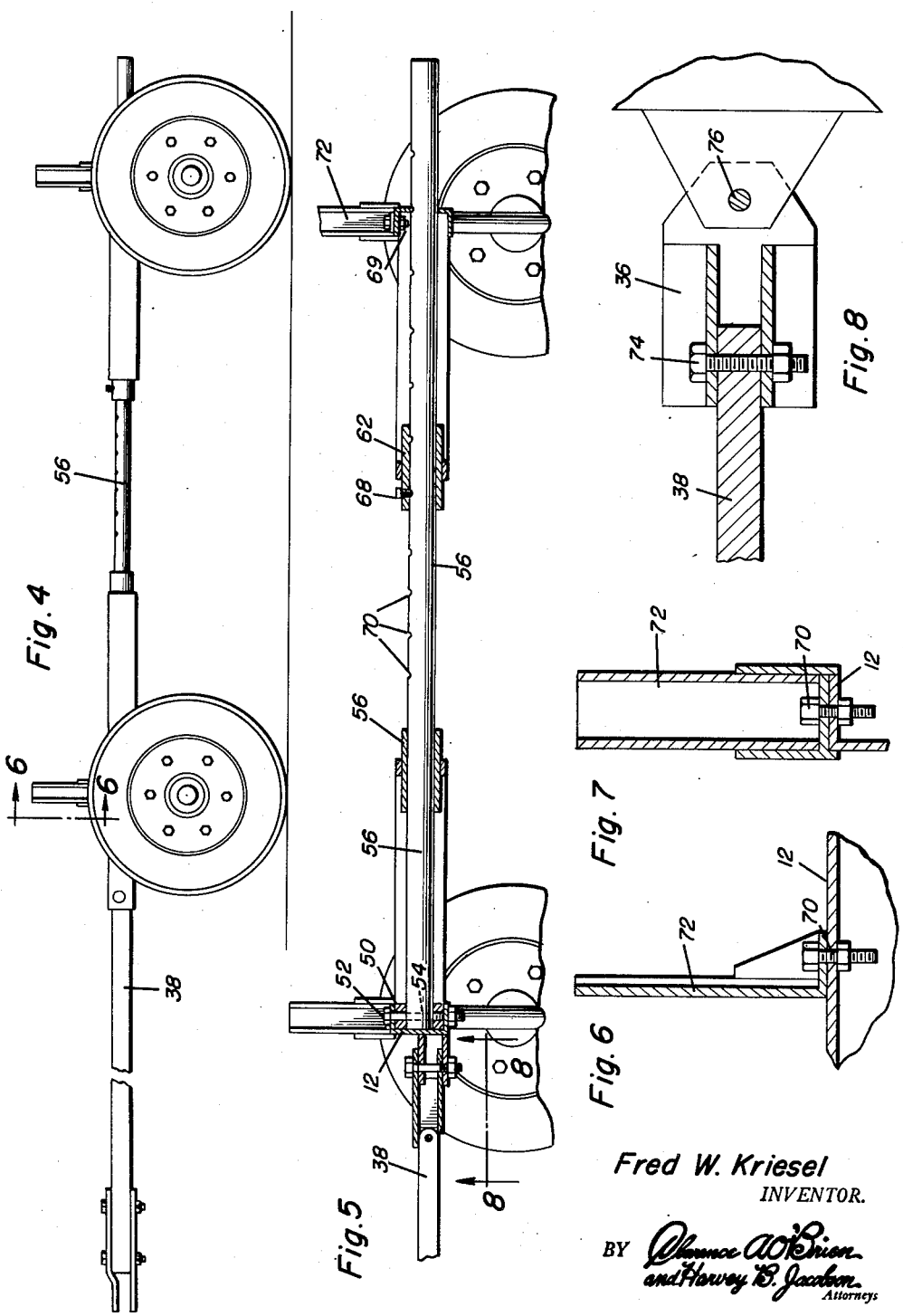
Fred W. Kriesel
INVENTOR.

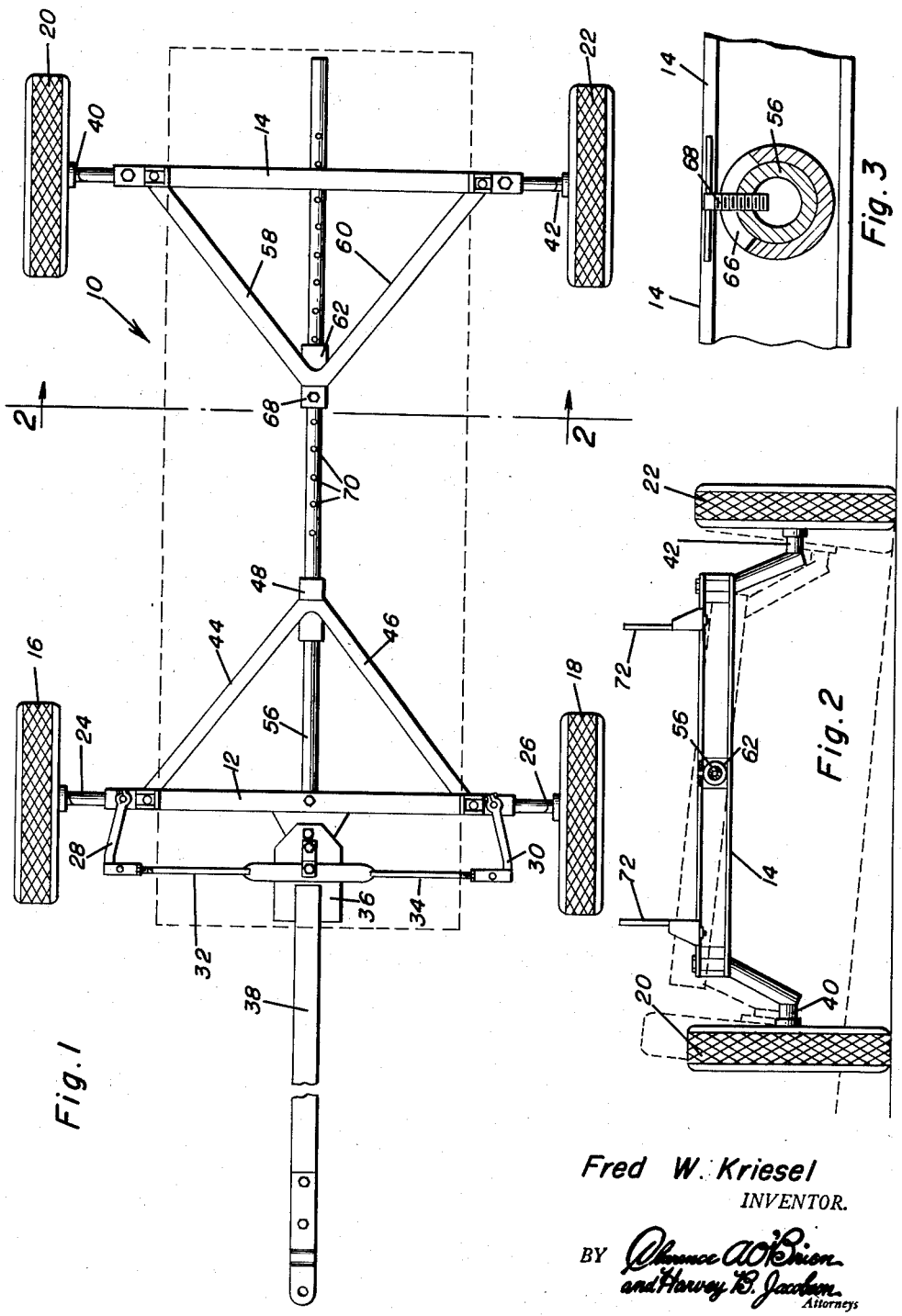

United States Patent Office 2,759,742
Patented Aug. 21, 1956

2,759,742

REACH AND AXLE STRUCTURE

Fred W. Kriesel, Gurley, Nebr.

Application November 9, 1953, Serial No. 390,830

1 Claim. (Cl. 280—141)

This invention relates to the class of land vehicles and more particularly to a novel trailer.

The primary object of this invention resides in the provision of a trailer of comparatively small size which includes novel means for readily adjusting the wheel base of the trailer.

One of the more important features of the invention resides in the fact that the means utilized for adjustably mounting the rear axle on the reach also permits relative rotation of the rear axle and the reach thereby providing a better ride for any article carried by the trailer.

The construction of this invention features mounting and guide sleeves carried by the axles and fore and rear hounds which are adapted to receive a reach therethrough, thus adequately and adjustably supporting the axles relative to each other.

Still further objects and features of this invention reside in the provision of a trailer that is strong and durable, of simple construction, which is rather inexpensive to manufacture and adapted for wide utility.

These, together with the various ancillary objects and features of the invention which will become apparent as the following description proceeds, are attained by this trailer, a preferred embodiment of which has been illustrated in the accompanying drawings, by way of example only, wherein:

Figure 1 is a plan view of the trailer comprising the present invention;

Figure 2 is a vertical sectional view as taken along the plane of line 2—2 of Figure 1;

Figure 3 is a sectional detail view on an enlarged scale illustrating the means utilized for rotatably mounting the rear axle relative to the reach;

Figure 4 is a side elevational view of the trailer;

Figure 5 is an enlarged sectional detail view illustrating the manner in which the axles are secured to the reach;

Figure 6 is a sectional detail view as taken along the plane of line 6—6 in Figure 4;

Figure 7 is a sectional detail view as taken on a plane transverse to the plane of line 6—6; and Figure 8 is a sectional detail view as taken along the plane of line 8—8 in Figure 5.

With continuing reference to the accompanying drawings wherein like reference numerals designate similar parts throughout the various views, reference numeral 10 generally designates the novel trailer comprising the present invention which includes a front axle 12 and a rear axle 14 from which there are suspended wheels 16, 18, and 20, 22. The wheels 16 and 18 are mounted on stub shafts 24 and 26 controlled by connecting arms 28, and 30 which are connected by tie rods 32 and 34, to a central bracket 36 and a tongue 38. The rear wheels 20 and 22 are mounted on stub shafts as at 40 and 42.

The axle 12 has rearwardly converging fore hounds 44 and 46 secured thereto which are attached to a forward guide sleeve 48. A forward mounting sleeve 50 is secured to the axle 12 and a bolt 52 extending through a hole as at 54 in the reach 56 is used to secure the sleeve 50 to the reach 56. Hence the forward axle 12 is mounted on the reach 56 and may be easily detached therefrom by merely releasing the bolt fastener 54.

The rear axle 14 carries forwardly extending rear hounds 58 and 60 which are attached to a rear mounting sleeve 62 provided with a slot 66 therethrough so that when a pin as at 68 is secured in one of the apertures 70 formed in spaced relationship in the reach 56 the rear axle 14 can be rotatably secured to the reach 56 in adjusted relationship since the fastener or pin 68 can move within the slot 66.

Secured by means of fasteners 70 to the axle 12 are upwardly extending standards 72 for carrying any sort of suitable structure as may be desired. Likewise, the tongue 38 may be adjustably secured to the mounting bracket 36 by means of a fastener 74. A pin as at 76 may be utilized for pivoting the mounting bracket 36 relative to the axle 12.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A chassis comprising front and rear axles, rearwardly convergingly extending fore hounds attached to said front axle and carrying a first guide sleeve, a first mounting sleeve carried by said front axle, forwardly convergingly extending rear hounds secured to said rear axle, a second mounting sleeve secured to said rear hounds, a reach extending through all of said sleeves, said first mounting sleeve being secured to said reach, means adjustably securing said second mounting sleeve to said reach to adjust the wheel base of said trailer, said reach having a plurality of spaced apertures therein, said second mounting sleeve having a slot therein extending transverse to said sleeve, said means including a pin extending through said slot and a selected one of said apertures whereby said second mounting sleeve and said rear axle are rotatable relative to said reach.

References Cited in the file of this patent

UNITED STATES PATENTS

| | | |
|---|---|---|
| 1,886,722 | Oppenheim | Nov. 8, 1932 |
| 2,562,098 | Hill | July 24, 1951 |